US007636309B2

United States Patent
Alicherry et al.

(10) Patent No.: US 7,636,309 B2
(45) Date of Patent: Dec. 22, 2009

(54) MULTI-PATH ROUTING USING INTRA-FLOW SPLITTING

(75) Inventors: Mansoor Ali Khan Alicherry, Scotch Plains, NJ (US); Jin Cao, Edison, NJ (US); Harsha S. Nagesh, Berkeley Heights, NJ (US); Chitra A. Phadke, Basking Ridge, NJ (US); Viswanath Poosala, Basking Ridge, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 539 days.

(21) Appl. No.: 11/169,194

(22) Filed: Jun. 28, 2005

(65) Prior Publication Data

US 2006/0291392 A1 Dec. 28, 2006

(51) Int. Cl.
*H04J 1/16* (2006.01)
(52) U.S. Cl. .............. 370/230.1; 370/229; 370/400; 370/401
(58) Field of Classification Search ............ 370/229, 370/230, 412, 351, 389, 474, 542, 221, 222, 370/228, 230.1, 235, 238, 252, 254, 392, 370/393, 394, 395.53, 400, 401, 411, 415, 370/416, 437, 465, 466, 468, 469, 470, 471, 370/473, 475, 535, 536, 537; 709/224, 223, 709/232, 233, 235, 239, 240, 241; 455/39, 455/86, 355, 446, 453
See application file for complete search history.

(56) References Cited

U.S. PATENT DOCUMENTS 5,255,181 A * 10/1993 Chapman et al. ............... 705/8
6,788,686 B1 * 9/2004 Khotimsky et al. ......... 370/394
2002/0024934 A1 * 2/2002 Galand et al. ............... 370/238
2003/0023750 A1 * 1/2003 Basturk ...................... 709/241
2003/0079013 A1 * 4/2003 I'Anson ..................... 709/224
2003/0081592 A1 * 5/2003 Krishnarajah et al. ....... 370/352
2005/0132044 A1 * 6/2005 Guingo et al. .............. 709/225
2005/0163045 A1 * 7/2005 Randriamasy .............. 370/229
2005/0201285 A1 * 9/2005 Simonis ..................... 370/235
2005/0207443 A1 * 9/2005 Kawamura et al. .......... 370/469
2005/0208949 A1 * 9/2005 Chiueh .................... 455/452.2
2005/0271060 A1 * 12/2005 Kodialam et al. ........... 370/394
2005/0276220 A1 * 12/2005 Kokko ....................... 370/230

(Continued)

OTHER PUBLICATIONS

Cetinkaya et al., Opportunistic Traffic Scheduling Over Multiple Network Paths, Sep. 2004, IEEE, pp. 1928-1937.*

(Continued)

*Primary Examiner*—Aung S Moe
*Assistant Examiner*—Abdullah Riyami
(74) *Attorney, Agent, or Firm*—Ryan, Mason & Lewis, LLP (57) ABSTRACT

Multi-path routing techniques using intra-flow splitting are disclosed. For example, a technique for processing traffic flows at a node in a network comprises the following steps/operations. At least one traffic flow is obtained. The at least one traffic flow comprises multiple packets or bytes. The at least one flow is split into at least two sub-flows, wherein each of the at least two sub-flows comprises a portion of the multiple packets or bytes. The packets or bytes of the at least two sub-flows are respectively routed on at least two paths in the network.

16 Claims, 2 Drawing Sheets

U.S. PATENT DOCUMENTS

| | | | |
|---|---|---|---|
| 2005/0286487 A1* | 12/2005 | Chitrapu | 370/351 |
| 2006/0039280 A1* | 2/2006 | Anandakumar et al. | 370/229 |
| 2006/0050736 A1* | 3/2006 | Segel | 370/474 |
| 2006/0067331 A1* | 3/2006 | Kodialam et al. | 370/395.41 |
| 2006/0140116 A1* | 6/2006 | Alicherry et al. | 370/230 |
| 2006/0140118 A1* | 6/2006 | Alicherry et al. | 370/235 |
| 2006/0215689 A1* | 9/2006 | Liu et al. | 370/465 |
| 2006/0250964 A1* | 11/2006 | Vasseur et al. | 370/238 |
| 2006/0274718 A1* | 12/2006 | Butenweg et al. | 370/351 |
| 2007/0002741 A1* | 1/2007 | Vaananen et al. | 370/235 |
| 2007/0071004 A1* | 3/2007 | Hasegawa et al. | 370/390 |
| 2007/0147254 A1* | 6/2007 | Larsson et al. | 370/238 |
| 2008/0031188 A1* | 2/2008 | Magnusson et al. | 370/329 |

OTHER PUBLICATIONS

J.C.R. Bennett et al., "Packet Reordering is Not Pathological Network Behavior," IEEE/ACM Transactions on Networking, vol. 7, No. 6, pp. 789-798, Dec. 1999.

A.I. Elwalid et al., "Effective Bandwidth of General Markovian Traffic Sources and Admission Control of High Speed Networks," IEEE/ACM Transactions on Networking, vol. 1, No. 3, pp. 329-343, Jun. 1993.

R. Guérin et al., "Equivalent Capacity and Its Application to Bandwidth Allocation in High-Speed Networks," IEEE Journal on Selected Areas in Communications, vol. 9, No. 7, pp. 968-981, Sep. 1991.

A. Simonian et al., "Large Deviations Approximation for Fluid Queues Fed by a large Number of On/Off Sources," IEEE Journal on Selected Areas in Communications, vol. 13, No. 6, pp. 1017-1027, Aug. 1995.

N. Likhanov et al., "Cell Loss Asymptotics in Buffers Fed with a Large Number of Independent Stationary Sources," IEEE Infocom, pp. 339-346, 1998.

R.G. Addie, "On Weak Convergence of Long-Range-Dependent Traffic Processes," Journal of Statistical Planning and Inference 80, pp. 155-171, 1999.

H. Nagesh et al., "Netswitch: Load-Balanced Data-Over-Optical Architecture for Mesh Networks," Bell Labs Technical Report, 17 pages, 2004.

"The Network Simulator—ns-2," www.isi.edu/nsnam/ns, 2 pages, 1989.

J. Cao et al., "Internet Traffic Tends Toward Poisson and Independent as the Load Increases," Nonlinear Estimation and Classification, eds., 26 pages, 2002.

F. Kelly, "Notes on Effective Bandwidths," Stochastic Networks: Theory and Applications, pp. 1-29, 1996.

N. Spring et al., "Measuring ISP Topologies with Rocketfuel," SIGCOMM, 13 pages, Aug. 2002.

R. Teixeira et al., "Characterizing and Measuring Path Diversity of Internet Topologies," SIGMETRICS, 2 pages, Jun. 2003.

P. Srisuresh et al, "OSPF-TE: An Experimental Extension to OSPF for Traffic Engineering," RFC, Network Working Group, pp. 1-45, Dec. 2002.

N.F. Maxemchuk, "Dispersity Routing," RCA Laboratories, ICC, 4 pages, Jun. 1975.

J. Chen et al., "An Efficient Multipath Forwarding Method," INFOCOM, pp. 1-9, Mar. 1998.

V. Paxson, "End-to-End Routing Behavior in the Internet," Proceedings of the ACM SIGCOMM Computer Communication Review, vol. 26, No. 4, , pp. 1-18, Aug. 1996.

E. Gustafsson et al., "A Literature Survey on Traffic Dispersion," IEEE Network, vol. 11, No. 2, pp. 28-36, Mar./Apr. 1997.

Cisco Systems, Inc., "Cisco Express Forwarding (CEF)," White Paper, pp. 1-4, 1997.

A. Elwalid, "MATE: MPLS Adaptive Traffic Engineering," INFOCOM, pp. 1-10, Aug. 2003.

V. Paxson, "End-to-End Internet Packet Dynamics," SIGCOMM, pp. 1-17, Jun. 1997.

R. Ludwig et al., "The Eifel Algorithm: Making TCP Robust Against Spurious Retransmissions," Computer Communications, vol. 30, No. 1, 7 pages, Jan. 2000.

E. Blanton et al., "On Making TCP More Robust to Packet Reordering," Computer Communication Review, vol. 32, pp. 1-11, Jan. 2002.

Z. Cao et al., "Performance of Hashing-Based Schemes for Internet Load Balancing," IEEE INFOCOM, 10 pages, Mar. 2000.

S. Rost et al, "Rate-Aware Splitting of Aggregate Traffic," Tech. Rep., MIT, pp. 1-12, 2002.

G. Kesidis et al., "Effective Bandwidths for Multiclass Markov Fluids and Other ATM Sources," IEEE Trans. Networking, vol. 1, No. 4, pp. 424-428, Aug. 1993.

C-S. Chang et al., "Effective Bandwidth in High Speed Digital Networks," IEEE Journal on Selected Areas in Communications, Nov. 1999.

D.D. Botvich et al., "Large Deviations, the Shape of the Loss Curve, and Economies of Scale in Large Multiplexers," Queueing Systems, vol. 20, pp. 1-23, Mar. 1995.

C. Courcoubetis et al., "Buffer Overflow Asymptotics for a Buffer Handling Many Traffic Sources," Journal of Applied Probability, vol. 33, pp. 1-21, 1996.

M. Mandjes et al., "Large Deviations for Small Buffers: An Insensitivity Result," Queuing Systems, vol. 37, pp. 1-12, 2001.

C. Courcoubetis et al., "Effective Bandwidths for Stationary Sources," Probability in Engineering and Information Sciences, vol. 9, No. 2, pp. 1-10, 1995.

N.G. Duffield et al., "Large Deviations and Overflow Probability for the Genera Single-Server Queue, with Applications," Mathematical Proceedings of Cambridge Philosophical Society, pp. 1-19, Jul. 1994.

I. Norros, "A Storage Model with Self-Similar Input," Queueing Systems, vol. 16, No. 3-4, pp. 1-9, 1994.

A. Erramilli et al., "Experimental Queueing Analysis with Long-Range Dependent Packet Traffic," IEEE/ACM Transactions on Networking, vol. 4, pp. 1-16, 1996.

A. Erramilli et al., "Performance Impacts of Multi-Scaling in Wide Area TCP/IP Traffic," Proceedings of IEEE Infocom, 8 pages, 2000.

J. Cao et al., "On the Nonstationarity of Internet Traffic," ACM SIGMETRICS, vol. 29, No. 1, 11 pages, 2001.

J. Cao et al., "Bandwidth Estimation for Best-Effort Internet Traffic," Statistical Science, pp. 1-51, 2004.

J. Cao et al., "Internet Traffic Tends Toward Poisson and Independent as the Load Increases," Nonlinear Estimation and Classification, pp. 1-18, 2002.

W.E. Leland et al., "On the Self-Similar Nature of Ethernet Traffic," ACM SIGComm, pp. 1-11, Sep. 1993.

M.S. Taqqu et al., "Proof of a Fundamental Result in Self-Similar Traffic Modeling," Computer Communication Review, vol. 27, pp. 1-19, 1997.

"Passive Measurement and Analysis (PMA)," NLANR PMA, http://pma.nlanr.net, 2 pages, 2005.

G. Appenzeller et al., "Sizing Router Buffers," SIGCOMM, 12 pages, Aug. 2004.

* cited by examiner

MULTI-PATH ROUTING USING INTRA-FLOW SPLITTING

FIELD OF THE INVENTION

The present invention relates generally to the field of data communication networks and, more particularly, to multi-path routing techniques using intra-flow splitting.

BACKGROUND OF THE INVENTION

The past decade has seen a tremendous growth in the amount of data traffic carried over wide area networks. This trend is expected to continue with the growing popularity of the Internet and the emergence of new applications such as Voice-over-Internet Protocol (VoIP).

In addition to the rising traffic volumes, there has also been an evolution in the underlying networks. From the optical transport layer and up, network topologies have become more mesh-like, allowing multiple diverse paths between source and destination nodes. This diversity is essential in providing resiliency for critical demands via backup paths. A high degree of connectedness in a network also allows sharing of traffic load across various links and demands, and hence better network utilization. This is important because long-haul bandwidth continues to be expensive due to the high costs of Wavelength Division Multiplexing (WDM) transport systems and high speed router ports.

Load-sharing can be achieved in two complementary ways. One way is through congestion-aware routing algorithms to route the demands such as, for example, Open Shortest Path First (OSPF) techniques. Another way is by routing the packets of the same demand over multiple paths along the way. The latter, called multi-path routing, provides fast resiliency as well as a finer degree of load sharing in the network. In fact, OSPF and other approaches have multi-path extensions, such as equal-cost multipath (ECMP) and optimized multipath (OMP), where routers distribute the incoming load on an interface over all available shortest paths. It is to be understood that "shortest paths" generally refers to the cheapest paths under the cost metric chosen by the OSPF algorithm.

In multi-path routing, packets can be distributed using either a round-robin mechanism or a hash function on the flow identifiers. The hash-based approach routes all packets of a flow over the same path and may lead to load imbalances due to variations in flow rates. While the round-robin scheme will lead to better load sharing, since the packets of the same flow may be sent over different links, they can arrive out-of-order at the destination. If not resequenced, out-of-order arrival of packets leads to increased dropping of packets by the higher layer protocols (e.g., Transmission Control Protocol), as well as jitter in delay. Resequencing at high traffic rates, on the other hand, requires expensive processors and large memories. As a result, the round-robin mechanism has been mostly unused in practice.

Admission control and capacity planning in a network require an accurate knowledge of the bandwidth needed on each link to carry the given traffic load. However, it is difficult to exactly compute the bandwidth needs of variable bit-rate (VBR) traffic, such as most of the data traffic. This is typically handled in practice via the concept of "effective bandwidth," which is an estimate of the bandwidth needed to satisfy a quality-of-service (QoS) requirement such as, for example, a drop rate, a maximum queuing delay, etc. Effective bandwidth depends on the traffic characteristics, i.e., the average rate and the variability, as well as the strictness of the QoS requirement.

SUMMARY OF THE INVENTION

Principles of the present invention provide multi-path routing techniques using intra-flow splitting.

For example, in one aspect of the invention, a technique for processing traffic flows at a node in a network comprises the following steps/operations. At least one traffic flow is obtained. The at least one traffic flow comprises multiple packets or bytes. The at least one flow is split into at least two sub-flows, wherein each of the at least two sub-flows comprises a portion of the multiple packets or bytes. The packets or bytes of the at least two sub-flows are respectively routed on at least two paths in the network.

Further, when at least a second traffic flow is obtained by the node, the splitting step/operation may further comprise splitting each of the traffic flows into at least two sub-flows. The routing step/operation may then further comprise combining ones of the sub-flows of at least a portion of the at least two traffic flows and routing the combined packets or bytes on one of the paths, and combining others of the sub-flows of at least a portion of the at least two traffic flows and routing the combined packets or bytes on another of the paths. The splitting step/operation may further comprise splitting the at least one traffic flow based on a split ratio vector.

Still further, splitting of the flows, combining sub-flows, and routing the packets or bytes of the combined sub-flows on at least two paths in the network may reduce a variance, loss probability, and a bandwidth requirement associated with the traffic flows. Also, the at least one traffic flow may be long range dependent or short range dependent.

These and other objects, features and advantages of the present invention will become apparent from the following detailed description of illustrative embodiments thereof, which is to be read in connection with the accompanying drawings.

DETAILED DESCRIPTION OF THE INVENTION

The following description will illustrate the invention in the context of an exemplary packet-switched mesh network. It should be understood, however, that the invention is not necessarily limited to use with any particular type of network. The invention is instead more generally applicable to any network in which it is desirable to provide improved multi-path routing.

Further, it is to be understood that the phrase "traffic flow" (or, simply, "flow") generally refers to a group (e.g., two or more) of packets that are to be routed in the network through the same source node/port and destination node/port pairing. A "path" in the network generally refers to a set of two or more nodes and one or more links between the nodes. "Nodes" generally refer to elements in the network at least capable of transferring packets. "Links" generally refer to connections between the nodes.

As will be illustratively explained in the sections of the detailed description below, principles of the invention provide multi-path routing techniques that perform intra-flow splitting. Advantageously, a significant variance reduction is realizable due to such splitting, which directly leads to much lower effective bandwidth needs as compared with flow-based splitting schemes. Bandwidth savings is illustratively quantified for various traffic models.

1. Multi-Path Routing and Traffic Modeling

In this section, different classes of multi-path routing are introduced, as well as various traffic modeling concepts used in an illustrative bandwidth analysis. Also, an illustrative intra-flow splitting methodology is described.

1.1 Network Model

In this detailed description, a packet-switched mesh network is illustratively assumed where traffic flows are generated by sources having specific statistical characteristics. A traffic flow is identified by a vector made up of a source node, a source port, a destination node, a destination port. Each node routes the packets based on a flow identifier.

Each link has certain finite capacity. When packets arrive at a rate greater than the link capacity, they are queued in a buffer. In the illustrative model, it is assumed that there is a finite buffer of size B bytes per link. Nodes drop packets when the queue is full. It is not critical to the analysis which packets are chosen for dropping.

When there are multiple paths from a source to destination, packets are routed across these multiple paths. The splitting can happen at any of the nodes along the way. For purposes of comparison, we consider two forms of splitting: (i) flow-based splitting; and (ii) intra-flow splitting in accordance with principles of the invention.

In flow-based splitting, packets of a flow take the same path. Note that traffic between the same source and destination can consist of multiple flows which may take different paths. An example of flow based splitting is hash-based ECMP, where the nodes compute a hash function on the flow-identifiers to determine the outgoing link.

In intra-flow splitting, packets of the same flow may be sent over different paths. Here, each path will carry a fraction of the traffic flow. This fraction may be decided based on link capacities and/or the current load.

For intra-flow splitting, a split ratio vector of a flow is defined as the proportion of the flow routed in each path. Let f be a traffic flow and K be its number of paths (not necessarily disjoint) from the source to destination. Let $p_i$ fraction of the flow be routed through the $i^{th}$ path ($\Sigma p_i=1$). This fraction can be in terms of bytes or packets. The fraction in terms of packets is used unless noted otherwise. The split ratio vector of f is called $(p_1, p_2, \ldots, p_k)$. If $p_i=1/K$ for $i=1 \ldots K$, then intra-flow splitting for the flow is round-robin. In that case we define K as the split factor.

It is to be understood that intra-flow splitting of the invention is different than round-robin ECMP in that intra-flow splitting of the invention is deterministic or intentional in nature. That is, while in round-robin ECMP, packets of the same flow may happen to be routed on different paths, this is not done intentionally or even deterministically calculated. That is, the breaking up of packets of a flow and routing them on different paths is merely a result of the fact that part of the packets of a flow may be received at a different time than other packets of the same flow. In such a case, the packets received first in time are assigned to the path that is currently available in the round-robin ECMP scheme, while the packets received later in time are assigned to the path that is available at that time. Under the round-robin ECMP scheme, this could be the same path or it could be a different path. Thus, there is no notion in round-robin ECMP of purposefully splitting flows into sub-flows.

Figure 1A:
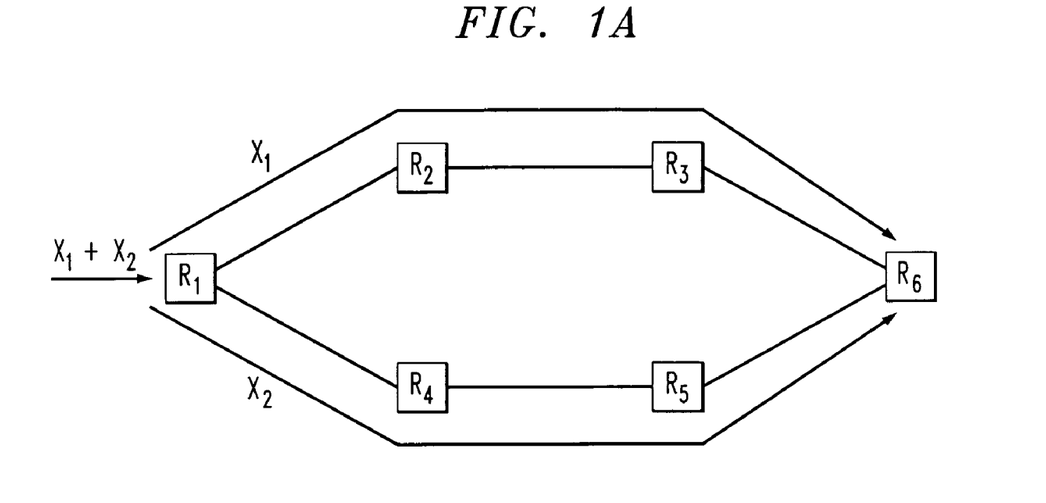
FIG. 1A illustrates a network employing flow-based splitting.
Figure 1B:
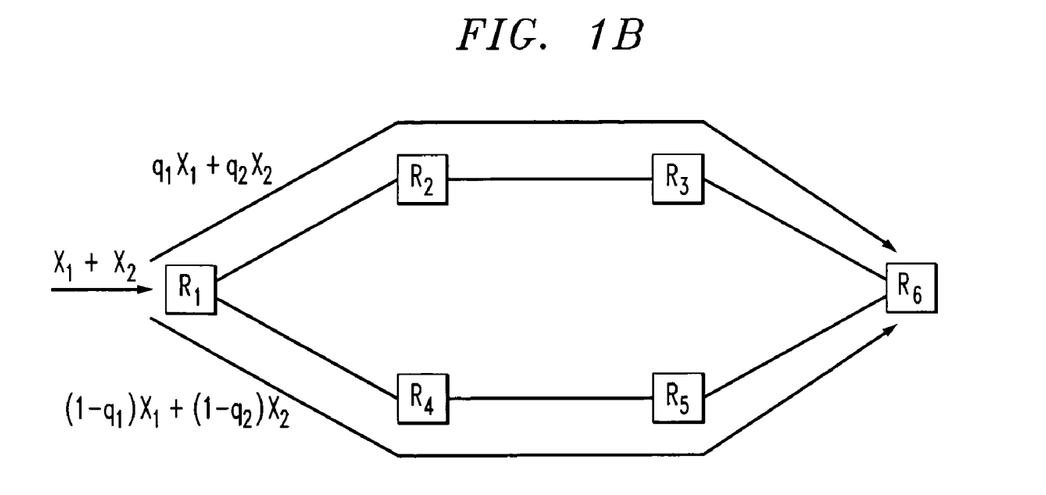
FIG. 1B illustrates a network employing intra-flow splitting, according to one embodiment of the invention.

FIGS. 1A and 1B illustrate the two forms of splitting. More particularly, FIG. 1A illustrates flow-based splitting and FIG. 1B illustrates intra-flow splitting. In the example shown, there are two flows $X_1$ and $X_2$ destined to the same destination $R_6$. There are two paths from $R_1$ to $R_6$.

In a flow based splitting scheme, flow $X_1$ takes the path $R_1$-$R_2$-$R_3$-$R_6$ and the flow $X_2$ takes the path $R_1$-$R_4$-$R_5$-$R_6$.

In intra-flow splitting, flow $X_1$ is split at $R_1$ with the split ratio vector $(q_1, 1-q_1)$. Then, $q_1$ fraction of the flow takes the path $R_1$-$R_2$-$R_3$-$R_6$ and the remaining takes the path $R_1$-$R_4$-$R_5$-$R_6$. Similarly for the flow $X_2$, the traffic is split with the split ratio vector $(q_2, 1-q_2)$.

Figure 2:
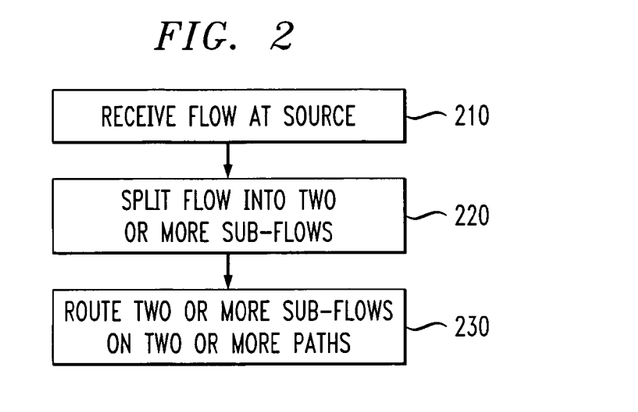
FIG. 2 illustrates an intra-flow splitting methodology, according to one embodiment of the invention.

More particularly, FIG. 2 illustrates an intra-flow splitting methodology according to the invention. As shown, at the source node, a flow is received (step 210). The packets of the flow are split (step 220), as explained above based on the split ratio vector, into two or more sub-flows. Then, the two or more sub-flows are routed on two or more selected paths (step 230) to the destination node. When there are more than two flows received at the source node, as shown in FIG. 1B, the steps of FIG. 2 can be performed on each flow, and sub-flows from different flows can be multiplexed or combined together and routed.

Note that the intra-flow splitting techniques of the invention not only allow splitting on exactly equal cost paths, they also allow splitting even if the paths are of nearly the same cost. This may lead to some longer paths, but bandwidth savings is still realized.

1.2 Traffic Model 1.2.1 Traffic Superposition

An important issue in traffic modeling is how to characterize the aggregate traffic going on the core network. As a background an illustrative model below, consider the Internet where packets are generated by the activities of individual users. Suppose that the user population is mostly homogeneous and each user acts independent of the other. The superposition model given below is a natural way of modeling the aggregate traffic in such common scenarios.

We assume that the traffic flows are stationary in short durations. Let $B_i(t)$ be the base traffic process between a pair i of users, which gives the number of bytes transferred in a time interval t. We assume that $B_i(t)$s are independent and identically distributed. We characterize traffic on the network as a superposition of traffic originating from multiple sources. Let Y(t) be the traffic process for any flow from a source to a destination, then we model Y(t) as superposition of the m independent and identically distributed base traffic processes, i.e.:

$$Y(t)=B_1(t)+\ldots+B_m(t), \quad (1)$$

We assume that for any two distinct flows $f_1$ and $f_2$, the traffic process $Y_1(t)$ and $Y_2(t)$ are independent.

For a flow Y(t), let the mean traffic rate be $\mu_y$, and let the autocovariance function be $\sigma_y r(t)$, where r(t) is the autocorrelation function. Note that the values of $\mu_y$ and $\sigma_y$ change with the flow but the autocorrelation function does not, because the base processes are independent and identically distributed. However, under the superposition model (Equation 1), it can be shown that $\mu_y$ is related to $\sigma_y$ by:

$$\sigma_y^2 = \alpha\mu_y, \quad (2)$$

for some constant α>0. In addition, this variance-mean relationship also holds under the further superposition of these aggregated flows. For a Gaussian traffic model completely characterized by the mean and covariance function, the flow model of Y(t) in Equation 1 can be rewritten more succinctly as follows:

$$Y(t) = \mu_y + \sigma_y Z(t), \sigma_y^2 = \alpha\mu_y, \quad (3)$$

where Z(t) is a stationary Gaussian process with variance 1.

1.2.2 Short-Range and Long-Range Dependent Model

Let X(t) be an ergodic and stationary traffic process, and let X[0, t] be the cumulative traffic arriving in the interval [0,t]. Define the variance time function of X(t) as V(t)=Var(X[0, t]). Define the index of dispersion of X(t) as:

$$v = \lim_{t\to\infty} V(t)/t, \quad (4)$$

then X(t) is said to be Short Range Dependent (SRD) if v is finite or Long Range Dependent (LRD) if otherwise. It can be shown that for a LRD process, the variance time function has the form:

$$v(t) \to L(t)t^{2H} \text{ as } t\to\infty,$$

where L(t) is a slowly varying function and parameter H is referred to as the Hurst parameter in the literature. Notice that LRD occurs for 1/2<H<1, and higher the value of H, the stronger the long-range dependence.

The discovery of long-range dependence in Ethernet traffic is considered to be one of the most significant in the area of traffic modeling. Further studies confirm that metropolitan area network (MAN) traffic, wide area network (WAN) traffic, and variable bit rate (VBR) traffic also exhibit LRD.

1.2.3 Fractional Brownian Motion Model

A popular class of LRD traffic model is the Fractional Brownian Motion (FBM). It has been shown that if traffic is the sum of on-off processes with heavy-tailed on/off period, then the traffic is LRD and that under certain limit conditions, the resulting traffic approaches the FBM process as the number of aggregation grows large.

Let X(t) be a traffic source generated using:

$$X[0, t] = \mu t + Z(t), \quad (5)$$

where X[0,t] is the total traffic arrived in the interval [0, t], and Z(t) is Gaussian process with zero mean. Then, X(t) is called Fractional Brownian Motion (FBM) with Hurst parameter H∈(0, 1) if Var Z(t)=σ²t^{2H}. Notice that when 1/2<H<1, X(t) is LRD and when H=1/2, X(t) is reduced to a Brownian motion that is short-range dependent.

It is to be appreciated that during parts of the illustrative analysis to follow, we model data traffic as composed of a superposition of multiple long-range dependent flows, each of which is best modeled by FBM.

2. General Analysis

In this section, we present an intuitive argument for the bandwidth savings from intra-flow splitting. The detailed analysis for various traffic models is given in Section 3 below.

2.1 Traffic Characteristics After Intra-Flow Splitting

Consider a source and destination node pair with K paths, where K>1. Let Y(t) be a flow between the source-destination pair, then using intra-flow splitting principles, with a splitting ratio vector $(p_1, \ldots, p_k)$, results in traffic $p_k Y(t)$ on path k from flow Y(t).

For an existing routing scheme, let $X_k(t)$ denote the cumulative flow on path k, k=1, ... K, between the source-destination pair. It is easy to see that the total flow between the source and destination pair is $$\sum_{i=1}^{K} X_i(t).$$

If we apply intra-flow splitting according to the invention, where all flows between the source-destination pair has the same splitting ratio vector $(p_1, \ldots, p_k)$, then the resulting traffic on path k is:

$$\tilde{X}_k(t) = p_k \sum_{i=1}^{K} X_i(t), \quad K = 1, \ldots, K \quad (6)$$

that is, a proportion $p_k$ of the multiplexed traffic between the source-destination node pair. Below in section 3, we will show that it is in fact this multiplexing that results in the bandwidth savings seen in the intra-flow splitting approach, and we will quantify it using the notion of effective bandwidth for Gaussian processes. In the following, we give an illustrative example of the bandwidth savings using the two-node network in FIG. 3.

2.2 Bandwidth Savings

Figure 3:
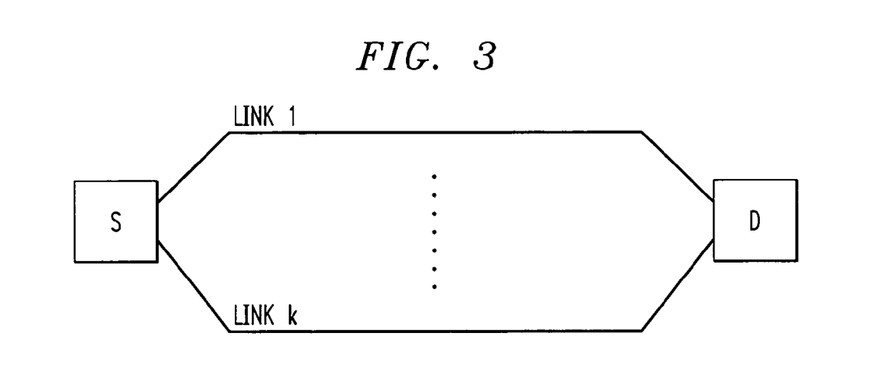
FIG. 3 illustrates a two-node network for use in describing one or more embodiments of the invention.

Consider the two-node network in FIG. 3. Suppose there are two parallel links between a source node S and a destination node D, with each link carry traffic $X_k(t)$, k=1,2 respectively. Suppose $X_1(t)$, $X_2(t)$ are independent and identically distributed Gaussian processes, we can rewrite $X_k(t)$, k=1, 2 as:

$$X_1(t) = \mu + \sigma Z_1(t), X_2(t) = \mu + \sigma Z_2(t)$$

where μ,σ² is the mean and variance, and $Z_1(t)$, $Z_2(t)$ are independently distributed as some process Z(t). Under the intra-flow splitting approach where all flows have the same splitting ratio vector (1/2,1/2) on the two links, the resulting traffic on both links (by Equation 6) is:

$$\tilde{X}_1(t) = \tilde{X}_2(t) = \frac{1}{2}(X_1(t) + X_2(t)),$$

which can be represented as:

$$\tilde{X}_1(t) = \mu + \frac{\sigma}{2}(Z_1(t) + Z_2(t)) = \mu + \frac{\sigma}{\sqrt{2}} Z(t).$$

Therefore under intra-flow splitting, the traffic on each link has the same mean rate as in the original scheme but a reduced variance. It is clear from queuing theory that the resulting traffic $\tilde{X}_k(t)$ requires less bandwidth than $X_k(t)$ for the same QoS requirement, and thus bandwidth savings is realized for the intra-flow splitting.

In the above, we have given a very simple example explaining intuition behind the bandwidth savings of intra-flow splitting. The idea is that intra-flow splitting results in traffic that has a higher degree of multiplexing on network links. If the intra-flow splitting approach is defined such that the mean traffic rate on the link remains the same, then the smoothing effect introduced by increased multiplexing leads to bandwidth savings.

However, the above explanation dealt with a simple network and traffic distribution, and does not actually quantify the savings. The next section analyzes the behavior more completely.

3. Analytical Results

In this section, we illustrate performance of the intra-flow splitting approach of the invention. We first demonstrate that for a simple two-node network, intra-flow splitting gives the optimal queueing performance, and hence realizes bandwidth savings over other routing schemes. Next, we compare the performance of intra-flow splitting with flow-based splitting for a general network and show that intra-flow splitting performs better under certain traffic assumptions. And finally, we give specific results of the performance gain in terms of loss probability and bandwidth savings for Gaussian traffic models and in particular the Fractional Brownian Motion traffic model. We assume that the split ratio vectors for all the flows between a same source and destination pair are the same.

3.1 Optimality for a Two-Node Network

It can be shown that there exists an intra-flow splitting that is optimal in terms of queueing performance and bandwidth savings for a two node network with parallel links. In particular, it can be shown that the optimal intra-flow splitting has the same split ratio vector for all the flows and the fraction of flow on a link is proportional to the link bandwidth.

Consider a simple two-node network with K links, e.g., network illustrated in FIG. 3. Let link k, k=1, ..., K have a bandwidth Ck and a buffer size $B_k$ that is proportional to the bandwidth, i.e. $B_k = \alpha C_k$. It can be shown that the intra-flow splitting approach with a splitting ratio vector that is proportional to the link bandwidths has an optimal queuing performance for a two-node network, i.e., the steady state queue length and loss probability are the smallest.

We show this using a discrete time traffic model, which can be used as an approximation for a continuous time model if the time unit goes to 0. Without loss of generality, in the following, we assume that the time unit is 1.

For link k, $1 \leq k \leq K$, let $X_k(t)$ be the total workload (bytes) arriving during the t-th time unit for an arbitrary routing scheme R, and let $Q_k(t)$, k=1, ..., K be the unfinished work at time t. Suppose that the queues for all links are empty at time t=0. It is well known that:

$$Q_k(t+1) = \min((Q_k(t) + X_k(t) - C_k)^+, B_k),$$

where $A^+ = \max(0, A)$. For link k, if the mean traffic arrival rate $E\{X_k(0)\}$ is less than the bandwidth $C_k$, then $Q_k(t)$ converges to the steady state distribution of unfinished workload, denoted by $Q_k(\infty)$.

Let:

$$X(t) = \sum_{k=1}^{K} X_k(t),$$

$$C = \sum_{k=1}^{K} C_k,$$

$$B = \sum_{k=1}^{K} B_k.$$

For an intra-flow splitting approach with the same split ratio vector $(p_1, \ldots, p_k)$ for all flows, the resulting traffic on link k in the interval t is $p_k X(t)$. Let $\tilde{Q}_k(t)$ be the unfinished workload of the approach at time t on link k. If the split ratio vector is such that $p_k$ is proportional to the link bandwidth $C_k$, it is easy to see that $\tilde{Q}_k(t) = p_k \tilde{Q}(t)$, where $\tilde{Q}(t)$ is the unfinished workload at time t on a link with bandwidth C and buffer size B carrying the total traffic X(t). Notice that:

$$\tilde{Q}(t+1) = \min((\tilde{Q}(t) + X(t) - C)^+, B),$$

and the fact that $$\left(\sum_{k=1}^{K} y_k\right)^+ \leq \sum_{k=1}^{K} y_k^+.$$

using a recursive argument, it is shown that:

$$\sum_{k=1}^{K} \tilde{Q}_k(t) = \tilde{Q}(t) \leq \sum_{k=1}^{K} Q(t) \text{ for any } t \geq 0.$$

Hence, for the steady state workload $$\sum_{k=1}^{K} \tilde{Q}_k(\infty) = \tilde{Q}(\infty) \leq \sum_{k=1}^{K} Q_k(\infty),$$

which shows that the intra-flow splitting approach has the optimal queue length.

To show that the intra-flow splitting approach has an optimal loss probability, first notice that the amount of bytes dropped by the routing scheme R on link k during $t^{th}$ time interval is $(Q_k(t) + X_k(t) - C_k - B_k)^+$. Let the steady state loss probabilities for the routing scheme R and intra-flow splitting approach be d and $\tilde{d}$, respectively. Then:

$$d = \frac{1}{E[X(0)]} \lim_{n \to \infty} \sum_{k=1}^{K} E((Q_k(n) + X_k(n) - C_k - B_k)^+)$$

$$\geq \frac{1}{E\{X(0]} \lim_{n \to \infty} E\left(\sum_{k=1}^{K} Q_k(n) + X(n) - C - B\right)^+$$

$$\geq \frac{1}{E[X(0)]} (\tilde{Q}(n) + X(n) - C - B)^+ = \tilde{d}$$

Accordingly, the optimal queueing performance of the intra-flow splitting approach can be translated to its optimal bandwidth savings. That is, for a two-node network, an intra-flow splitting approach requires the least amount of total bandwidth to satisfy a QoS criteria of a maximum queueing delay and a loss probability.

It is to be appreciated that the optimal performance of the intra-flow splitting approach is the result of the multiplexing gain because intra-flow splitting essentially uses a single link to carry the multiplexed traffic by combining bandwidths and buffer sizes of the multiple links between two nodes.

3.2 Performance Improvements in a General Network

In this section, we illustrate the performance gain of intra-flow splitting over flow-based splitting for a general network. We show that under the traffic assumption in section 1.2 (i.e., each flow is the result of superposition of independent and identically distributed base traffic flows), the intra-flow splitting approach performs better over flow-based splitting. We first demonstrate this for Gaussian traffic models and then generalize it to arbitrary traffic models.

For a general network, let R be a flow-based splitting scheme for a given traffic demand. For any pair of a source node S and a destination node D, assume that there are K paths (distinct paths may share common links), and let $X_k(t)$, $1 \leq k \leq K$ be the cumulative flow on the kth path under scheme R. Let $\tilde{R}$ be the intra-flow splitting approach where all flows between the source and destination pair has the same split ratio vector $(p_1, \ldots p_k)$ such that $p_k$ is proportional to the mean traffic rate $\mu_k$ of $X_k(t)$, i.e.:

$$p_k = \frac{\mu_k}{\sum_{k=1}^{K} \mu_k}. \tag{7}$$

We use this split ratio vector to ensure that all links in the network have the same mean traffic rate under both schemes.

For a Gaussian traffic model that satisfies the superposition assumption in Equation (3) (section 1.2.1), the intra-flow splitting approach defined in Equation (7) has a superior performance over the flow-based splitting scheme R for any link in the network. Specifically, any link with a given bandwidth and buffer size has a smaller queue length and loss probability. In addition, for a given QoS requirement of maximum delay and loss probability, the QoS bandwidth of the traffic on the link is smaller.

This can be shown as follows. Under the assumption that each flow is the result of superposition of independent and identically distributed base traffic (section 1.2.1 and Equation (3), for a flow-based splitting scheme R, the traffic $X_k(t)$ carried on path k between the source node S and destination node D can be written as:

$$X_k(t) = \mu_k + \sigma_k Z_k(t),\ \sigma_k^2 = \alpha \mu_k,\ k=1, \ldots, K$$

for some $\alpha > 0$, where $Z_k(t)$ are independent stationary Gaussian processes identically distributed as a Gaussian process $Z(t)$. Notice that under intra-flow splitting approach $\tilde{R}$ defined in Equation (7), the traffic carried on path k is:

$$\tilde{X}_k(t) = p_k \sum_{k=1}^{K} X_k(t) = \mu_k \left( \sum_{k=1}^{K} \mu_k \right)^{-1} \sum_{k=1}^{K} X_k(t),$$

with mean:

$$E(\tilde{X}_k(t)) = \mu_k \left( \sum_{k=1}^{K} \mu_k \right)^{-1} \sum_{k=1}^{k} \mu_k = \mu_k,$$

and variable part identically distributed as:

$$p_k \left( \sum_{i=1}^{K} \sigma_k^2 \right)^{\frac{1}{2}} Z(t) = p_k \left( \alpha \sum_{i=1}^{K} \mu_k \right)^{\frac{1}{2}} Z(t) = p_k^{\frac{1}{2}} \sigma_k Z(t),$$

that is:

$$\tilde{X}_k(t) = \mu_k + p_k^{\frac{1}{2}} \sigma_k Z(t),$$

so that the mean traffic rate on path k stays the same as in the flow-based splitting, but the variance is reduced by a factor of $p_k$. Given the independence assumption of distinct flows in the superposition model (section 1.2.1), it can be concluded that for any link in the network, under the intra-flow splitting approach $\tilde{R}$, the mean traffic rate stays the same but the variance is reduced with the same correlation function. This follows from the fact that the traffic process $\mu + \sigma_1 Z(t)$ always results in less queueing and hence smaller loss probability, or less QoS bandwidth, comparing to the traffic process $\mu + \sigma_2 Z(t)$ with $\sigma_2 > \sigma_1$.

Such result can be generalized to an arbitrary base traffic model.

Under the assumption that each flow is the result of superposition of independent and identically distributed base traffic (section 1.2.1), the intra-flow based splitting approach defined in Equation (7) has a superior performance over the flow-based splitting scheme R for any link in the network. Specifically, any link with a given bandwidth and buffer size has a smaller queue length and loss probability. in addition, for a given QoS requirement of maximum delay and loss probability, the QoS bandwidth of the traffic on the link is smaller.

This can be shown as follows. Using the same notation as above, for each path k, $1 \leq k \leq K$ between a source node S to a destination node D, let $X_k(t)$, $\tilde{X}_k(t)$ be the traffic carried under the flow-based splitting scheme R and intra-flow based splitting approach $\tilde{R}$, respectively. For simplicity, we assume that $X_k(t)$, k=1, \ldots, K are independent and identically distributed as $B_1(t) + \ldots + B_m(t)$ for some $m \geq 1$, where $B_i(t)$ is the base process defined in Equation (1). Similar arguments can be used to show for the general cases with more complicated notations. For any link on the path k from the source-destination pair, we consider two scenarios: first, there is no through traffic from a different source-destination pair on the link, and second, there is through traffic from a different source-destination pair on the link. We show that for both cases the $\tilde{R}$ performs better than R.

For scenario 1, the traffic on a link on path k is $X_k(t)$ under R and $$\frac{1}{k} \sum_{k=1}^{K} X_k(t)$$

under $\tilde{R}$. Let C be the link bandwidth and B be the buffer size. Applying the above propositions to a hypothetical two-node network with K parallel links with bandwidth C and buffer size B with link k carrying traffic $X_k(t)$, k=1, \ldots, K, it can be seen that the queuing performance (queue length, loss probability) for this network is worse than the same network running under a intra-flow splitting approach with link k carrying traffic $$\frac{1}{k} \sum_{k=1}^{K} X_k(t).$$

This is equivalent to saying that the queueing performance for a link in scenario 1 carrying traffic $$\tilde{X}_k(t) = \frac{1}{K}\sum_{k=1}^{K} X_k(t)$$

is always better than the link carrying traffic $X_k(t)$.

For scenario 2, let $X_k^{(o)}(t)$, $\tilde{X}_k^{(o)}(t)$ be the cumulative through traffic on the link under the flow-based splitting scheme R and the intra-flow splitting approach $\tilde{R}$, respectively. Using similar argument as in scenario 1, we can show that a link carrying traffic $X_k(t)+X_o(t)$ has a worse performance comparing to the same link carrying traffic $$\frac{1}{K}\sum_{k=1}^{K} X_k(t) + X_o(t),$$

which by a recursive argument, implies that it has a even worse performance then the link carrying traffic is $$\frac{1}{K}\sum_{k=1}^{K} X_k(t) + \tilde{X}_k^{(o)}(t).$$

This means intra-flowing splitting has a better performance versus flow-based splitting for links in scenario 2.

It is useful to point out differences between the results presented here for the general network and that for the two-node network in section 3.1. Here we have shown that queueing and bandwidth requirement for individual links in a general network under the intra-flow splitting approach are less than those under the flow-based splitting scheme, assuming the traffic superposition model in Equation 1. But in section 3.1, we have shown that the total queueing and bandwidth requirement for all the links between the two nodes is minimum over all routing schemes. In addition, the splitting ratios in the split ratio vector for the intra-flow splitting approach for the network are proportional to the mean path throughput, but the splitting ratios for the optimal intra-flow splitting approach for the two-node network are proportional to the link bandwidths. In fact, the link bandwidth concept used to define the optimal intra-flow splitting approach for the two-node network may not be easily generalizable to a general network.

That said, it should be understand that, as in the case for the two-node network, the performance gain of the intra-flow splitting over flow-based splitting scheme for a general network is also due to the multiplexing gain. This can be easily understood for the Gaussian traffic model, where the multiplexing gain resulted from the split ratio vector defined in Equation (7) produces a traffic stream with the same mean rate but a smaller variance, which in turn leads to a better queueing and bandwidth performance. In the following section, we quantify the performance gain for the Gaussian traffic model, and in particular, the popular Fractional Brownian (FBM) traffic model, using the notion of effective bandwidth.

3.3 Bandwidth Savings for Gaussian and Fractional Brownian Traffic Models

In this subsection, we quantify the improvements in loss probability and bandwidth savings for intra-flow splitting.

First, we introduce the concept of effective bandwidth to analyze bandwidth requirements. Then, we show the reduction in loss probability for the Gaussian models based on the reduction in variance in intra-flow splitting approach. Finally, we show the bandwidth savings for the long range dependent Fractional Brownian Motion and the short range dependent Gaussian models.

3.3.1 Effective Bandwidth

The notion of effective bandwidth provides a measure of the resource requirements of a traffic stream with certain quality-of-service (QoS) constraints. Statistical properties of the traffic stream have to be considered as well as system parameters (e.g., buffer size, service discipline) and the traffic mix. A mathematical framework for effective bandwidth has been defined based on the general expression (see, e.g., F. Kelly, "Notes on Effective Bandwidths," Stochastic Networks: Theory and Applications, Oxford University Press, pages 141-168, 1996, the disclosure of which is incorporated by reference herein):

$$\alpha(s, t) = \frac{1}{st}\log E[e^{sX[0,t]}]\ 0 \leq s, t \leq \infty \tag{8}$$

which depends on the space parameter s and the time parameter t. In a practical use of this expression, appropriate values of s and t may be determined based on the QoS requirements and system parameters.

We will use the following proposition to quantify the reduction in loss probability of and effective bandwidth for Gaussian traffic models under the intra-flow splitting scheme.

Let L(nC, nB) be the loss probability or overflow probability for a queue fed by n identical, independent and stationary sources on a link with capacity nC and buffer size nB.

Then:

$$\lim_{n\to\infty} -\frac{1}{n}\log L(nC, nB) = \inf_{t>0}\sup_{s}(s(B + Ct) - st\alpha(s, t)),$$

where $\alpha(s, t)$ is the effective bandwidth defined by Equation 8.

3.3.2 Reduction in Loss Probability

In this subsection, we show that intra-flow splitting has lower loss probability than flow-based splitting for Gaussian models. That is, for the same network, the logarithm of the loss probability reduces by a factor of variance reduction.

For a link l with a fixed bandwidth C and buffer size B, let $X_1$ and $X_2$ be the Gaussian input process for flow-based and intra-flow splitting scheme respectively. Let:

$$X_1(t)=\mu+\sigma_1 Z(t), X_2(t)=\mu+\sigma_2 Z(t),$$

where Z(t) is a stationary Gaussian process. We know that $\sigma_2 \leq \sigma_1$.

Let the loss rate for the traffic processes $X_1(t)$ on the link be $e^{-v_1}$. Then the loss rate for $X_2(t)$ on the link will be $e^{-v_2}$ where $v_2$ is approximately $$\frac{\sigma_1^2}{\sigma_2^2}v_1.$$

This can be shown as follows. Without loss of generality, we assume both $\sigma_1$, and $\sigma_2$ are very small. Otherwise, we can always define a new $Z(t)$ as $\epsilon^{-1}Z(t)$ to make $\sigma_1$, $\sigma_2$ arbitrary small. Notice that $$\frac{1}{\sigma_i^2} X_i(t), i = 1, 2$$

is identically distributed as the sum of $$n_i = \frac{1}{\sigma_i^2}$$

independent processes which are identically distributed as $\mu+Z(t)$. Let $$\frac{1}{\sigma_i^2}$$

and let $l_i$ be the link with bandwidth $n_i c$ and buffer size $n_i b$. The queueing behavior (and hence loss probability) for the flow $X_i$ on link $l$ is same as that of $$\frac{1}{\sigma_i^2} X_i(t)$$

on link $l_i$. Hence applying the above proposition as $\sigma_1$, $\sigma_2 \to 0$:

$$-\frac{1}{n_i} \log e^{-\nu_i} \approx \inf_{t>0} \sup_s (s(b+ct) - st\alpha(s,t))$$

Hence $\sigma_1^2 \nu_1 \approx \sigma_2^2 \nu_2$, which proves the proposition.

Hence if flow-based splitting has a loss probability $d<1$ and if the variance reduces by a factor $r$ for intra-flow splitting, then the loss probability for intra-flow splitting will be $d^r$. In particular, for a two-node network with K parallel links where under the flow-based splitting, traffic on all links are independent and identically distributed Gaussian processes, the variance reduces by a factor of K. Hence if the loss probability for flow-based splitting is d, then the loss probability for the intra-flow splitting will be $d^K$.

3.3.3 Reduction in Bandwidth

Although it is easy to characterize how the loss probability for a Gaussian traffic model $\mu+\sigma Z(t)$ changes with $\sigma$, it is quite difficult to characterize how the effective bandwidth will change with $\sigma$. This is because there is no general formula for the choice of the space and time parameter s, t in Equation 8 for Gaussian processes. In this section, we show the bandwidth savings for short range dependent Gaussian process for effective bandwidth in the large buffer asymptotic regime where the time parameter t goes to infinity. More importantly, we also show the bandwidth savings for the long-range dependent Fractional Brownian Motion (FBM), which is frequently used to model Internet traffic.

(A) Short Range Gaussian Process

For a short-range dependent Gaussian process with mean rate u and index of dispersion v (Equation 4), the effective bandwidth for an QoS requirement of an overflow probability $\exp^{-\nu}$ for a buffer size B in a large buffer asymptotic regime is:

$$C = \mu + \frac{vu}{2B}.$$

(B) Fractional Brownian Motion

Let $X(t)=\mu+\sigma Z(t)$, where $Z(t)$ is Fractional Brownian Motion process with Hurst parameter H, then the effective bandwidth for $X(t)$ for a buffer size B and drop rate $e^{-\nu}$ is:

$$C = \mu + H(1-H)^{\frac{1-H}{H}} 2^{\frac{1}{2H}} \sigma^{\frac{1}{H}} v^{\frac{1}{2H}} b^{\frac{H-1}{H}}. \tag{9}$$

It is easy to see that the second term in Equation 9 is the additional bandwidth required (besides the mean throughput) for the variable part of the FBM process, $\sigma Z(t)$, to satisfy the given QoS criteria, and we call this term the variable bandwidth. Notice that the variable bandwidth is proportional to $$\sigma^{\frac{1}{H}}.$$

Therefore, if the variance is reduced by a factor of r, then the variable bandwidth will be reduced by a factor of $$r^{\frac{1}{2H}}.$$

This variable bandwidth reduction factor does not depend on the QoS criteria (loss probability $e^{-\nu}$ and buffer size B). As an example, for a two node network with K parallel links where under the flow-based splitting, traffic on all links are independent and identically distributed FBM processes, the index of dispersion v reduces by a factor K for intra-flow splitting. Hence the variable bandwidth required reduces by a factor $$K^{\frac{1}{2H}}.$$

In case of H=1, i.e, the Brownian motion, there is a saving of (K−1)/K in variable bandwidth for intra-flow splitting compared to flow based splitting.

4. Illustrative Node Implementation

Figure 4:
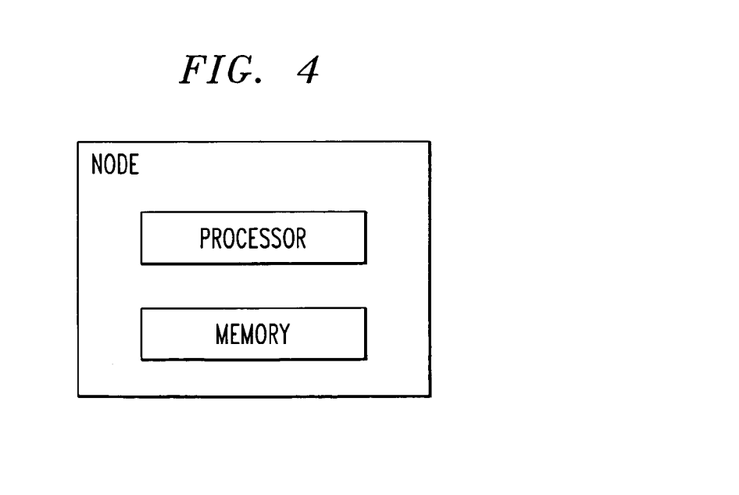
FIG. 4 illustrates an implementation of a node, according to one embodiment of the invention.

FIG. 4 illustrates an implementation of a node, according to an embodiment of the invention. More particularly, FIG. 4 illustrates node 400, which may act as a source node, an intermediate node, and/or a destination node in a network (e.g., FIG. 1B) in which intra-flow splitting principles of the invention are employed. It is to be appreciated that one or more of the routing methodologies of the embodiments described herein may be implemented via the computing system of network node 400. For example, the methodology of FIG. 2 may be implemented in network node 400. Other types of node configurations may be used, as will be appreciated by those skilled in the art, and a given network may include many nodes with differing configurations.

Generally, as shown, node 400 is configured so as to include processor 410 coupled to memory 420. Processor 410 may comprise a microprocessor, a microcontroller, a central processing unit (CPU), an application-specific integrated circuit (ASIC) or other type of processing device, as well as portions or combinations of such devices. Memory 420 may comprise an electronic random access memory (RAM), a read-only memory (ROM) or other type of storage device, as well as portions or combinations of such devices. The memory may be used to store software that is executed by or otherwise utilized by the processor in implementing at least a portion of a routing methodology in accordance with the present embodiments.

Node 400 may be viewed as an example of a "processing device." Such a processing device may be implemented in the form of one or more integrated circuits, as well as in the form of other types of hardware, software or firmware, in any combination.

It is to be appreciated that node 400 is considerably simplified for purposes of illustration, and may include other elements, not explicitly shown. For example, node 400 may include conventional interfaces and/or protocols for transmitting data to, and receiving data from, one or more other nodes in the network.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

We claim:

1. A method of processing traffic flows at a node in a network, comprising the steps of:
   - obtaining by the node a plurality of traffic flows, each of the traffic flows comprising multiple packets or bytes;
   - splitting by the node each of the plurality of traffic flows into at least two sub-flows, wherein each of the at least two sub-flows comprises a portion of the multiple packets or bytes from its respective traffic flow; and
   - routing by the node the packets or bytes of the at least two sub-flows respectively on at least two paths in the network;
   - wherein the routing step further comprises combining at least one of the sub-flows of each of at least two of the plurality of traffic flows and routing the combined packets or bytes on one of the paths;
   - wherein each traffic flow between the node and a given destination node is split based on a given split ratio vector into a plurality of sub-flows corresponding to respective ones of a plurality of paths between the node and the given destination node, and further wherein the given split ratio vector is configured such that the portion of the multiple packets or bytes assigned to each of the plurality of sub-flows is based at least in part on a ratio between a mean traffic rate of a cumulative flow on the respective corresponding path and a sum of mean traffic rates of cumulative flows on the plurality of paths.

2. The method of claim 1, wherein the routing step further comprises combining others of the sub-flows of at least a portion of the plurality of traffic flows and routing the combined packets or bytes on another of the paths.

3. The method of claim 1, wherein the splitting of the plurality of flows into at least two sub-flows and routing the packets or bytes of the at least two sub-flows respectively on at least two paths in the network reduces a variance associated with at least one of the traffic flows.

4. The method of claim 3, wherein the splitting of the flows into at least two sub-flows and routing the packets or bytes of the at least two sub-flows respectively on at least two paths in the network reduces a loss probability associated with at least one of the traffic flows.

5. The method of claim 4, wherein the loss probability is d, where d is the loss probability of flow-based splitting and r is the reduction in variance for intra-flow splitting.

6. The method of claim 4, wherein the reduction is realizable at a network design time or a provisioning time.

7. The method of claim 2, wherein the splitting of the traffic flows into sub-flows, combining ones of the sub-flows, combining others of the sub-flows, and routing the packets or bytes of the combined sub-flows on at least two paths in the network reduces a bandwidth requirement associated with the traffic flows.

8. The method of claim 7, wherein a variable bandwidth is reduced by a factor of $$r^{\frac{1}{2H}},$$

where r is a variance reduction factor and H is a Hurst parameter.

9. The method of claim 7, wherein the reduction is realizable at a network design time or a provisioning time.

10. The method of claim 1, wherein at least one of the traffic flows comprises a long range dependent traffic flow or a short range dependent traffic flow.

11. Apparatus for processing traffic flows at a node of a network, comprising:
   - a memory; and
   - a processor coupled to the memory and operative to: (i) obtain a plurality of traffic flows, each of the plurality of traffic flows comprising multiple packets or bytes; (ii) split each of the plurality of traffic flows into at least two sub-flows based on a split ratio vector, wherein each of the at least two sub-flows comprises a portion of the multiple packets or bytes from its respective traffic flow; and (iii) route the packets or bytes of the at least two sub-flows respectively on at least two paths in the network;
   - wherein the routing operation further comprises combining at least one of the sub-flows of each of at least two of the plurality of traffic flows and routing the combined packets or bytes on one of the paths;
   - wherein each traffic flow between the node and a given destination node is split based on a given split ratio vector into a plurality of sub-flows corresponding to respective ones of a plurality of paths between the node and the given destination node, and further wherein the given split ratio vector is configured such that the portion of the multiple packets or bytes assigned to each of the plurality of sub-flows is based at least in part on a ratio between a mean traffic rate of a cumulative flow on the respective corresponding path and a sum of mean traffic rates of cumulative flows on the plurality of paths.

12. The apparatus of claim 11, wherein the routing operation further comprises combining others of the sub-flows of at least a portion of the plurality of traffic flows and routing the combined packets or bytes on another of the paths.

13. The apparatus of claim 11, wherein the splitting of the plurality of flows into at least two sub-flows and routing the packets or bytes of the at least two sub-flows respectively on at least two paths in the network reduces a variance associated with at least one of the traffic flows.

14. The apparatus of claim 12, wherein the splitting of the traffic flows into sub-flows, combining ones of the sub-flows, combining others of the sub-flows, and routing the packets or bytes of the combined sub-flows on at least two paths in the network reduces a bandwidth requirement associated with the traffic flows.

15. The apparatus of claim 11, wherein at least one of the traffic flows comprises a long range dependent traffic flow or a short range dependent traffic flow.

16. A multi-path routing-capable node of a mesh-type network, comprising:
   a memory; and
   a processor coupled to the memory and operative to: (i) obtain a plurality of traffic flows, each of the traffic flows comprising multiple packets or bytes; (ii) split each of the plurality of flows into at least two sub-flows based on a split ratio vector, wherein each of the sub-flows comprises a portion of the multiple packets or bytes from its respective traffic flow; and (iii) combining ones of the sub-flows of each of the plurality of traffic flows and routing the combined packets or bytes on one path of the mesh-type network, and combining others of the sub-flows of each of the at least two traffic flows and routing the combined packets or bytes on another path of the mesh-type network, such that at least one of the sub-flows of each of at least two of the plurality of traffic flows are combined and routed on a given path of the mesh-type network;

wherein each traffic flow between the node and a given destination node is split based on a given split ratio vector into a plurality of sub-flows corresponding to respective ones of a plurality of paths between the node and the given destination node, and further wherein the given split ratio vector is configured such that the portion of the multiple packets or bytes assigned to each of the plurality of sub-flows is based at least in part on a ratio between a mean traffic rate of a cumulative flow on the respective corresponding path and a sum of mean traffic rates of cumulative flows on the plurality of paths.

* * * * *

UNITED STATES PATENT AND TRADEMARK OFFICE
CERTIFICATE OF CORRECTION

| | |
|---|---|
| PATENT NO. | : 7,636,309 B2 |
| APPLICATION NO. | : 11/169194 |
| DATED | : December 22, 2009 |
| INVENTOR(S) | : M. A. K. Alicherry et al. |

Page 1 of 1

It is certified that error appears in the above-identified patent and that said Letters Patent is hereby corrected as shown below:

In the claims:

Claim 5, col. 16, line 4 please delete "d" and insert -- $d^r$ --.

Signed and Sealed this

Sixteenth Day of February, 2010

David J. Kappos
*Director of the United States Patent and Trademark Office*

UNITED STATES PATENT AND TRADEMARK OFFICE
CERTIFICATE OF CORRECTION

PATENT NO. : 7,636,309 B2  Page 1 of 1
APPLICATION NO. : 11/169194
DATED : December 22, 2009
INVENTOR(S) : Alicherry et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 880 days.

Signed and Sealed this

Twenty-first Day of December, 2010

David J. Kappos
*Director of the United States Patent and Trademark Office*